United States Patent [19]

Stoll

[11] 4,103,941
[45] Aug. 1, 1978

[54] DISCONNECTABLE COUPLING FOR CONDUITS OF DEFORMABLE MATERIAL

[76] Inventor: Kurt Stoll, Lenzhalde 72, Esslingen, Germany

[21] Appl. No.: 756,002

[22] Filed: Jan. 3, 1977

Related U.S. Application Data

[63] Continuation of Ser. No. 595,619, Jul. 14, 1975, abandoned.

[51] Int. Cl.² ............................................. F16L 33/18
[52] U.S. Cl. ................................. 285/238; 285/322; 285/382
[58] Field of Search ............... 285/322, 255, 243, 382, 285/315, 319, 238

[56] References Cited

U.S. PATENT DOCUMENTS

| | | | |
|---|---|---|---|
| 767,893 | 8/1904 | Jewell | 285/243 |
| 1,086,641 | 2/1914 | Blume | 285/322 X |
| 1,241,654 | 10/1917 | Osgood | 285/382 X |
| 1,659,268 | 2/1928 | Hooley | 285/322 |
| 1,936,669 | 11/1933 | Heeter | 285/382 X |
| 2,032,297 | 2/1936 | Mikulasek | 285/243 |
| 2,253,691 | 8/1941 | Darling | 285/243 |
| 2,388,179 | 10/1945 | Proud | 285/315 X |
| 2,574,625 | 11/1951 | Coss | 285/382 X |
| 2,751,767 | 6/1956 | Hedden | 285/382 X |
| 2,784,987 | 3/1957 | Corcoran | 285/322 |
| 3,224,800 | 12/1965 | Fisher | 285/315 X |
| 3,394,950 | 7/1968 | Jensen | 285/322 X |
| 4,013,310 | 3/1977 | Dye | 285/322 X |

FOREIGN PATENT DOCUMENTS

| | | | |
|---|---|---|---|
| 572,729 | 2/1924 | France | 285/322 |
| 360,241 | 2/1906 | France | 285/322 |
| 505,991 | 12/1954 | Italy | 285/322 |
| 701,109 | 2/1966 | Italy | 285/322 |

*Primary Examiner*—Thomas F. Callaghan
*Attorney, Agent, or Firm*—Watson, Cole, Grindle & Watson

[57] ABSTRACT

A disconnectable coupling device in the form of a plug-in-socket connection for conduits of deformable material includes at one end a socket adapted to receive the end of a conduit and at the other end a threaded connection member. A securing device is provided for fixing the inserted conduit in position, the securing device being sub-divided by longitudinally extending slots into a plurality of resilient collet chuck elements uniformly distributed around the periphery. These chuck elements surround the end of the conduit from the outside, the conduit being inwardly free of support. The socket has a conical portion whose outer diameter increases in the axial direction towards the free end thereof which includes at least partially the collet chuck elements. The securing device is composed of a securing ring displaceable along the conical portion of the outer periphery of the socket and movable to clamp the collet chuck elements together on the end of a conduit. An arrangement is provided by which the securing ring is held against unintentional displacement from its locking position but can be moved easily from such position by hand.

1 Claim, 6 Drawing Figures

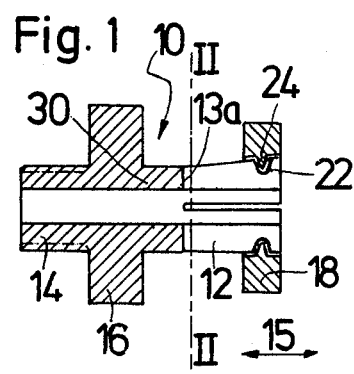
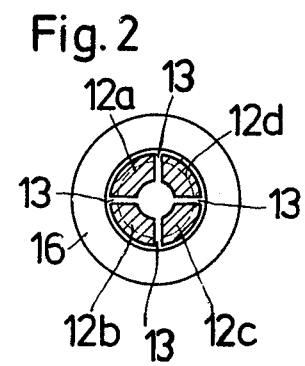
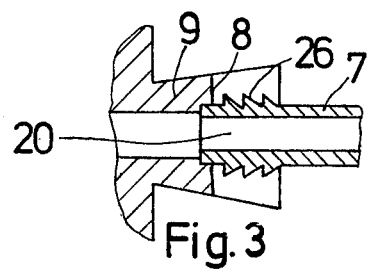
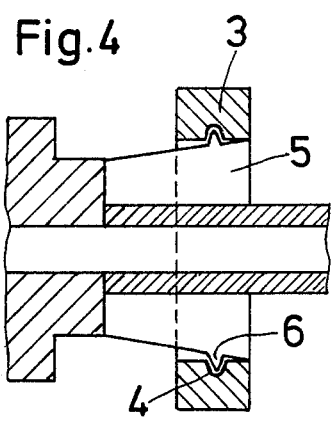
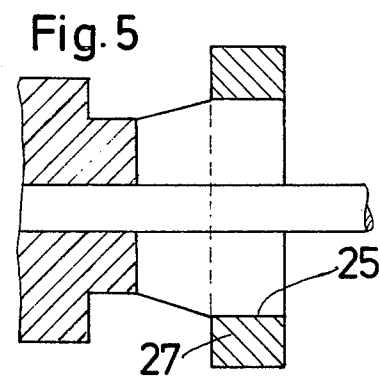

DISCONNECTABLE COUPLING FOR CONDUITS OF DEFORMABLE MATERIAL

This is a continuation of application Ser. No. 595,619, filed July 14, 1975 and now abandoned.

The invention relates to disconnectable coupling devices in the manner of a plug-and-socket-connection for conduits made of a plastics material, rubber, or the like, for carrying gaseous or fluid media such as air under pressure, the coupling device comprising at one end a socket-type connecting piece which is adapted to receive the end or the conduit and, at the other end, a threaded piece which constitutes a second connection, and a securing device to hold the inserted conduit end securely in its correct position.

It is an object of the invention to provide a disconnectable coupling device of the aforesaid kind which is composed of a relatively small number of parts, avoiding the drawbacks of known devices which have numerous components and are therefore expensive and liable to malfunctioning. A further object of the invention consists in to provide a coupling device of the abovesaid kind which can be established as often as desired and which can also be used to establish connections stable and durable also when there arise pulsations or when the conduit "breathes".

This problem has been solved by the provision of a coupling device in which the end of the conduit can be clamped inside a socket which is designed in the form of a collet. In this way a coupling unit is provided which avoids the drawbacks and shortcomings of known coupling devices, is simple in its design, and is cheap to manufacture.

Coupling devices according to the invention comprise a small number of parts and are simple and easy to manipulate. This makes is possible to assemble the threaded piece with the hose or conduit instantaneously so that valuable time can be saved when, say, hoses have to be connected up in a simulated pneumatic layout, or when new personnel have to be trained, or when extensive connections have to be made in a control box where, depending on the complexity of the system, hundreds of couplings may have to be joined in a pneumatic system.

The threaded socket preferably consists of a few parts only, namely a threaded piece with a cylindrical extension designed as a collet acting from the outside, and a securing ring. To connect with the conduit of hose, the latter is simply inserted into this collect-type neck, after which the securing ring is pushed over the conical member to ensure that the outer surface of the hose is clamped all round. This fixing and clamping effect may be enhanced by sawtooth recesses in the inner bore of the collet. To instantaneously disconnect the conduit or hose, the securing ring is pushed out of its fixing groove, and along the tapered surface of the cone, until it is in its initial position adjacent the thread. The effect of the collet-chuck is thereby cancelled, so that the pressure hose or conduit can be pulled out of the socket without difficulty. The simplicity of the design and the small number of parts involved reduce manufacturing costs. The coupling can moreover be made very economically from, say, extruded plastics or moulded vulcanite. Generally, a connection or coupling is provided which not only can be established quickly, simply, and as often as desired, but which is also stable and durable when the conduit "breathes" i.e. when there are pulsations and vibrations. Whith such a connection, the securing ring can not be lost furthermore, the conduit is not damaged and the hose not crushed or excessively squeezed, the flow resistance is not altered and the flow of medium is not hindered in any way, and finally, the expenditure of force necessary for establishing the connection is as small as can be imagined.

Embodiments of the invention are described below, by way of example only, with reference to the accompanying drawings, in which:

FIG. 1 is an axial section through a preferred embodiment of coupling decive according to the invention;

FIG. 2 is a front view of the coupling device shown in FIG. 1;

FIGS. 3 to 5 show a number of variants of the arrangement according to FIGS. 1 and 2, each in axial section.

Figure 6:
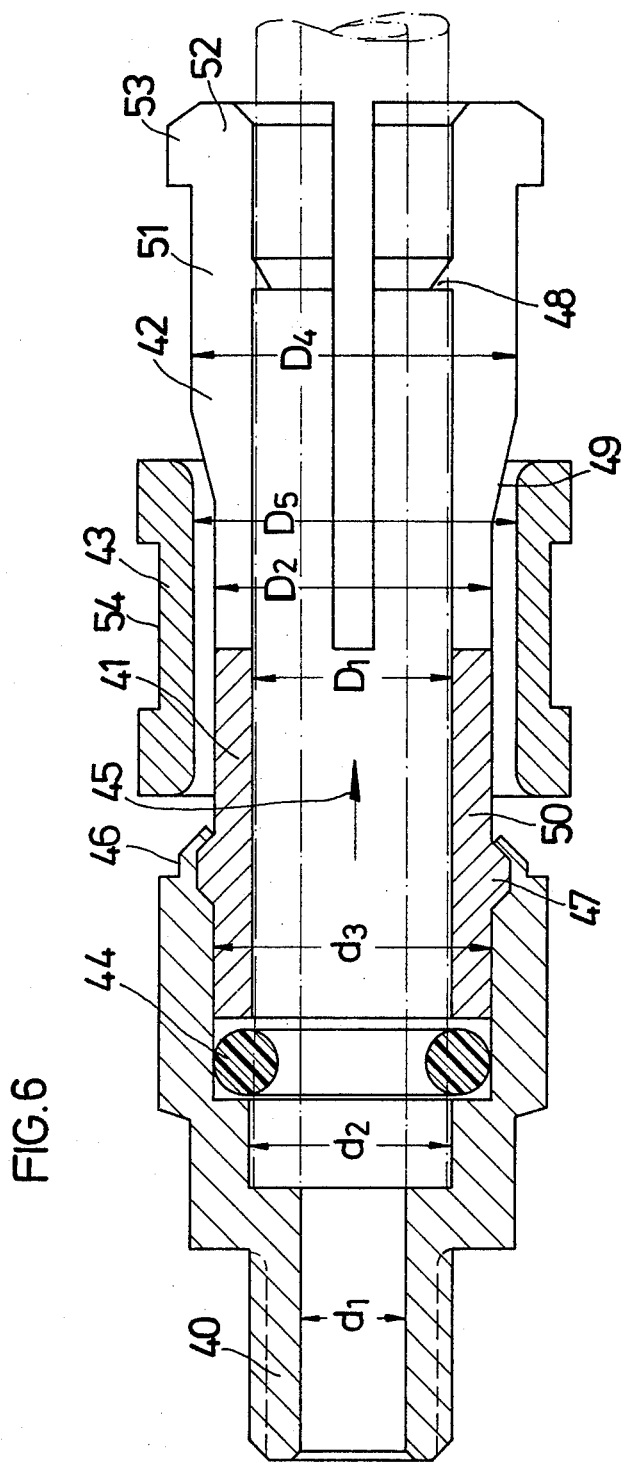
FIG. 6 another modified embodiment of the invention in a sectional side view and only schematically.

As shown in FIGS. 1 and 2, the coupling unit 10 consists of three parts, namely a socket 12, a threaded connecting piece 14 which is fixed to the socket, preferably by forming an integral part of it, and which serves, for example, as a means by which to connect with a solid, metallic, pipe, the connecting piece 14 having a flange 16, and the device also comprising a securing ring 18 which can be moved in the two directions of arrow 15 along the outer surface of the socket 12. The socket 12 is designed in the form of a collet and comprises several flexible chuck parts or segments, which are spaced about evenly, forming a circle. During the clamping stage, these segments are pressed inwardly, acting upon the hose from all sides, with a uniform pressure. In the illustrated example, the socket comprises four segments, 12a, 12b, 12c, and 12d which are separated, one from the others, by gaps 13. These gaps extend to radial end faces 13a. The coupling according to FIGS. 1 and 2 consists of rotationally symmetrical parts.

In its assembled state when ready for use, the threaded connecting piece 14 is normally connected with a solid, metallic, pipe or screwed into the wall of a pneumatic or hydraulic component, for example, the cylinder head of a cylinder-set, the flange 16 serving as a stop member and for additional, mechanical, stabilization. Alternatively, the flange 16 can be designed as a hexagonal head and serve as a control element. When the coupling is to be connected with a pressure hose or a conduit carrying pressure media, the securing ring 18 is displaced so that its position corresponds roughly to that of the ends 13a at the slots 13 which separate the collet segments 12a to 12d, or it may be pushed back to the flange or annular part 16. In this way, the socket which serves as a collet, is completely opened, all the chuck segments being clear of the ring 18, and the hose end can be inserted into the axial mouth of the socket. This is followed by longitudinal adjustment of the securing ring 18, which is pushed over the conical surface of the socket 12 and assumes the position shown in FIG. 1, where a projection 24 on the ring 18 engages a groove 22 in the outer surface of the socket. The ring 18 is thereby retained in this locking position.

The physical effort required to force the securing ring into its groove can be avoided by using an alternative design where neither the groove 22 on the outer surface of the socket nor the projection 24 on the inner surface of the ring is provided, both surfaces being smooth. In this arrangement, with the securing ring 18 in the position shown in FIG. 1, the collet which constitutes the socket 12, is essentially closed and the hose end 7 inserted into it is prevented from slipping out. The anchorage effect can be enhanced by toothing 26 on the inner surface of the axial bore of the socket 9 as shown in FIG. 3. In the embodiment according to FIG. 3, the socket 9 includes an internal shoulder 20 which is stepped towards the centre in relation to the end face 8 to which the slots between the collet segments extend. This shoulder serves as an axial stop member for the hose 7 when inserting it into the socket. With this arrangement, insertion of the hose to the correct extent is facilitated. Since the slots between the collet segments do not extend as far as the central shoulder 20, tight connection between the hose and the socket is further enhanced, the hose, being under additional pressure at its end portion, forming a tight seal with the closed area which surrounds its end portion.

It will be appreciated that the embodiments described are extremely simple and easy to handle and that the connection achieved is safe, the only condition being that the end portions of the hoses should be reasonably stiff, axially. This, however, is usually the case with conventional plastics hoses. A further guarantee of safe anchorage is provided by the uniform pressure which is ex-erted from all sides by the collet segments or chucks which are pressed against the hose.

The basic coupling piece and also the securing ring may consist of a suitable plastics material, but it is equally feasible to use steel or brass provided that the dimensions permit it, especially those of the collet segments 12a to 12d. The interaction between the groove in the collet surface and the projection around the securing ring 18 in the arrangement of FIGS. 1 and 2 is, of course, only one of many possibilities. As shown in FIG. 4, the collect can be provided with an annular projection 6 which corresponds to a groove 4 in the securing ring 3. It may be desirable, for example, to avoid the socket being compressed excessively when tightening the securing ring compared with its compression in the end position when the annular projection engages with the groove around the socket. In this case, the zone adjacent to the conical section could be of constant diameter or could have a smaller angle of inclination, to create a fixing zone which, when using a material with a favourable co-efficient of friction, enables the securing ring to be fixed in its end position without using additional means of anchorage. The angle at which the outer surface of the collet 26, or a portion 25 thereof, is inclined could be such that the securing ring 27 is a self-retaining member as shown in FIG. 5. The number of segments of chucks in the socket may also vary in accordance with varying requirements.

With the arrangement according to FIG. 6, the plug-in-socket-connection according to the invention has a first part containing a threaded connecting piece 40 at the one end, a part at the other end which contains a socket 41 and is subdivided by longitudinal slots 42 into several collet chuck elements, for example, four such elements uniformly distributed around the periphery of the socket, and a securing ring 43 displaceable to and fro.

According to the invention the part containing the threaded connecting piece and the part containing the socket are separate parts independent from one another which are separately manufactured and are connected thereafter so as to be disconnectable, for example, in the manner of a plug-in-socket-connection. Thereby, the part containing the socket is inserted with its end facing away from the collet chuck elements into the part containing the threaded connecting piece at the end thereof facing away from the thread, whereby a sealing ring 44 is located therebetween. In order not to prejudice the flow of the medium during establishing the connection, according to the invention the diameters of the bores of the part containing the socket and of the part containing the threaded connecting piece are so matched one to another that reducing of the cross section in direction of the flow according to arrow 45 is avoided. The bore of the part containing the threaded connecting piece has an end portion at the thread side with the smallest inner diameter $d1$, a middle portion with a middle inner diameter $d2$, which corresponds to the inner diameter D1 of the part containing the socket and which is approximatively constant over the whole length of this part, and an outer end portion the inner diameter $d3$ of which is the largest one and which corresponds to the outer diameter D2 of the inserting end of the socket. The constant inner diameter D1 of the bore of the part containing the socket thereby corresponds to the inner diameter $d2$ of the middle portion of the part containing the threaded connecting piece, the inner diameter d1 of the thread-side end portion corresponds to the inner diameter D3 of the inserted end of the conduit, whereas the difference between the smallest inner diameter $d1$ and the middle inner diameter $d2$ corresponds approximatively to the thickness D of the inserted end of the conduit.

Furthermore, the part containing the socket has on its outer surface a projection 47, for example, of ring-like form and conveniently of trapezoidal cross section, which is gripped preferably on the side facing away from the thread by a bent off shoulder 46 of the part containing the threaded connecting piece, which shoulder 46 may be, for example, of ring like shape.

For further securing the established connection, according to a further feature of the invention the collet chuck elements have on their inner periphery at least one inwardly projecting tooth 48, the cross section of which is saw-toothed, such that the teeth allow the inserting of the end of the conduit, but tend to prevent it to be withdrawn. Thereby, the resilient collet chuck elements of the socket surround on the outside after insertion of the conduit the inserted end thereof which is non supported at its inner end.

It can be taken from FIG. 6 of the drawings that that part containing the socket has at least one conical portion 49 the outer diameter of which increases in axial direction according to arrow 45 and towards the free end thereof and radially outwards. This conical portion which is contained between a first cylindrical portion 59 constituting the inserting end and a second cylindrical portion 51 with larger outer diameter and situated towards the free end of the part is allotted at least partially to the collet chuck elements, whereby the longitudinal slots 42 which subdivide the part containing the socket into individual collet chuck elements extend from the free end of the part at 52 approximatively over the half length thereof and are allotted to the second cylindrical portion 51, to the conical portion 49 and to a part of the first cylindrical portion 50.

In order to further secure the connection against disconnection, the part containing the socket has a securing section. Thereby, the securing ring 43 upon reaching the securing section is secured against unintentional displacement, whereby it may be easily removed by hand from the securing section. This securing section is constituted conveniently by a section of the part containing the socket the slope of which is so determined that the securing ring is retained in this section by self-locking, whereby the inner diameter D5 of the securing ring corresponds approximatively to the outer diameter D4 of the second cylindrical portion of the part containing the socket.

Another purpose fulfilled by the present invention consists in that the securing ring is so guided on the part containing the socket that it can not be lost. To this purpose the part containing the socket has at its free end an abutment 53 conveniently in the form of an abutting ring, the outer diameter of which is larger than the inner diameter of the securing ring. In this manner the securing ring is prevented from accidentally being pushed off the socket or the part containing the socket during establishing the connection. The securing ring has further on its outer periphery a recess 54 of preferably ring like shape.

What I claim is:

1. A disconnectable coupling device in the form of a plug-in-socket-connection for conduits of deformable material, which comprises, at one end, a socket having a bore adapted to receive the end of a conduit, at the other end, a threaded connecting member having three coaxial bores of different diameters, the first bore of the three being nearest the socket and having a diameter approximately equal to the outside diameter of the socket, the second bore of the three being adjacent to the first bore and having a diameter approximately equal to the inside diameter of the socket, and the third bore of the three being adjacent to the second bore and nearest the free end of the connecting member and having a diameter smaller than that of the second bore and corresponding to the inner diameter of the conduit to be connected to the device, an end of said socket being partially inserted into the first bore of the said threaded connecting member, said inserted end of the socket including an annular projection on the outside surface thereof and the threaded connecting member including an annular recess on the inner surface thereof adapted to receive the annular projection, the device further including a sealing ring located between the inserted end of the socket and the intersection of the first and second bores of the threaded connecting member, and a securing device to fix the inserted conduit in position, said socket being subdivided by longitudinally extending slots into a plurality of resilient collet chuck elements uniformly distributed around the periphery and having a generally smooth bore surface including one projecting annular tooth element spaced a distance from the free end of the socket, which collet chuck elements upon insertion of the end of the conduit into the bore of the socket surround from the outside the inserted end of the conduit which is without support at its inner side, the socket having at least one outer conical portion with the outer diameter increasing in the axial direction towards a securing section at the free end thereof, said securing section having an inclination which is less than that of the conical portion, said conical portion and said securing section including at least partially the outer surfaces of said collet chuck elements, said securing device comprising a securing ring axially slidable along the outer surfaces of said collet chuck element of the socket, said securing ring having a cylindrical inner surface of a diameter which is slightly less than the outer diameter of the securing section and being movable by hand between an inactive position on the side of the socket facing the threaded connecting member and an active position in which it surrounds the securing section of the socket, in which active position the securing ring forces the collet chuck elements into their locking position in which they clamp the end of the conduit in the manner of a collet chuck and in which active position the securing ring is retained by self-locking.

* * * * *